United States Patent [19]
Lew et al.

[11] Patent Number: 5,351,556
[45] Date of Patent: Oct. 4, 1994

[54] COMPOUND ELECTRONIC FILTER FOR VORTEX FLOWMETERS

[76] Inventors: Yon S. Lew; Hyok S. Lew, both of 7890 Oak St., Arvada, Colo. 80005

[21] Appl. No.: 113,197

[22] Filed: Aug. 30, 1993

Related U.S. Application Data

[63] Continuation-in-part of Ser. No. 848,291, Mar. 9, 1992, Pat. No. 5,309,771.

[51] Int. Cl.$^5$ ............................................. G01F 1/32
[52] U.S. Cl. .................................................. 73/861.22
[58] Field of Search ........... 73/861.22, 861.23, 861.24, 73/861.21, 861.18, 861.34

[56] References Cited

U.S. PATENT DOCUMENTS

| | | | |
|---|---|---|---|
| 4,270,391 | 6/1981 | Herzl | 73/861.22 |
| 4,934,194 | 6/1990 | Itoh et al. | 73/861.22 |
| 4,966,040 | 10/1990 | Ohmae | 73/861.22 |

Primary Examiner—Herbert Goldstein

[57] ABSTRACT

A compound electronic filter for conditioning an alternating electrical signal generated by vortex shedding in a vortex flowmeter has a first stage filter comprising a first plurality of electronic filters respectively including a first plurality of electronic switches and a second stage filter comprising a second plurality of electronic filters respectively including a second plurality of electronic switches, wherein the first plurality of electronic switches switching on and off the first plurality of electronic filters one at a time are controlled by a first command signal generated from the frequency of the output signal from the first stage filter, and the second plurality of electronic switches switching on and off the second plurality of electronic filters one at a time are controlled by a second command signal generated from the frequency of the output signal from the first stage filter.

20 Claims, 7 Drawing Sheets

COMPOUND ELECTRONIC FILTER FOR VORTEX FLOWMETERS

This patent application is a continuation-in-part application to patent application Ser. No. 07/848,292 entitled "Method for Processing Signals in Vortex Flowmeters" filed on Mar. 9, 1992, now U.S. Pat. No. 5,309,771.

FIELD OF INVENTION

This invention relates to a compound electronic filter conditioning an alternating electrical signal in the vortex flowmeters, which compound electronic filter comprises a first stage filter controlled by the frequency of the alternating electrical signal measured at the output end of the first stage filter, and a second stage filter controlled by the frequency of the alternating electrical signal conditioned by the first stage filter measured at the input end of the second stage filter.

BACKGROUND OF INVENTION

With few exceptions, all prior arts teaching the construction and operation of electronic filters for conditioning electrical signals in the vortex flowmeters employ the well known and routinely practiced feedback method to control the switching of a plurality of filters included in a parallel bank of filters. In other words, these prior arts measure the frequency of the alternating electrical signal generated by the vortex shedding in the flowmeter at the output end of the parallel bank of filters and generates a dc voltage from the measured value of the frequency of the alternating electrical signals, which dc voltage is fed back to switch on one of the filters that selectively transmits the alternating electrical signal oscillating at the measured frequency. Generally, the above-described feedback method controlling the switching of individual filters included in the parallel bank of filters does not work in conditioning the alternating electrical signal of very low amplitude generated by the vortex shedding at very low velocities of fluid flow, because the parallel bank of filters controlled by the feedback command signal locks on the noise signal created by mechanical vibrations of the vortex flowmeter rather than on the very weak vortex signal. The parent patent application Ser. No. 07/848,291 discloses a method that overcomes the problem and difficulty existing with the prior arts, in which method the switching of individual filters included in a parallel bank of filters is controlled by a command signal generated by the frequency of the alternating electrical signal measured at the input end of the parallel bank of filters instead of the output end thereof. It has been discovered that the method controlling the switching of the individual filters constituting the parallel bank of filters by generating a command signal from the frequency of the alternating electrical signal taken at the input end of the parallel bank of filters works best, when the alternating electrical signal put into the parallel bank of filters is preconditioned by another parallel bank of filters including at least two parallel individual filters.

BRIEF SUMMARY OF INVENTION

The primary object of the present invention is to provide a series compound electronic filter conditioning an alternating electrical signal generated by the vortex shedding in a vortex flowmeter, that comprises a first stage filter including a parallel bank of electronic filters controlled by a command signal generated from the frequency of the alternating electrical signal measured at the output end of the first stage filter, and a second stage filter including a parallel bank of electronic filters controlled by a command signal generated from the frequency of the alternating electrical signal measured at the output end of the first stage filter and at the input end of the second stage filter, wherein a single individual electronic filter included in each of the first and second stage filters is switched on at one time when the measured frequency of the alternating electrical signal is equal to or greater than a threshold frequency assigned to the particular individual electronic filter that selectively transmits an alternating electrical signal oscillating at frequencies distributed within a band width about the threshold frequency. Of course, the individual electronic filter of the lowest frequency band included in each of the first and second stage filters stays normally switched on, when no command signal is generated because of the absence of a detectable frequency of the alternating electrical signal at a junction between the output end of the first stage filter and the input end of the second stage filter.

Another object is to provide the series compound electronic filter described in the primary object of the present invention, wherein the first stage filter includes a single pair of parallel filters respectively transmitting the alternating electrical signal in a low frequency range and a high frequency range, which pair of parallel filters are controlled by the frequency of the alternating electrical signal detected at the output end of the first stage filter in comparison with a single threshold frequency in such a way that only one of the pair of parallel filters is switched on at one time, and the high frequency range individual filter becomes switched on when the measured frequency is equal to or greater than the threshold frequency and the low frequency range individual filter becomes switched on when the measured frequency is less than the threshold frequency or when there is no output signal with amplitude greater than zero or a preset minimum value from the first stage filter.

A further object is to provide the series compound electronic filter described in the primary object of the present invention, wherein the first stage filter has an over-ride control system backing up the regular control system using the command signal generated from the measured frequency of the alternating electrical signal, which over-ride control system switches on and off the individual electronic filters in a sweep or scanning mode when the level of the alternating electrical signal put into the first stage filter is greater than zero or a preset minimum value and the level of the alternating electrical signal put out from the first stage filter is equal to zero or less than a preset minimum value, and turns off the switching in the sweep or scanning mode as soon as the level of the alternating electrical signal put out from the first stage filter becomes greater than zero or the preset minimum value, whereupon the regular control system using the command signal generated from the measured frequency of the alternating electrical signal takes over.

Yet another object is to provide a parallel compound electronic filter conditioning an alternating electrical signal generated by the vortex shedding in a vortex flowmeter, that comprises a single stage filter including a parallel combination of a plurality of low frequency electronic filters controlled by a command signal generated from the frequency of the alternating electrical signal measured at the output end of the single stage filter and a plurality of high frequency electronic filters controlled by a command signal generated from the frequency of the alternating electrical signal measured at the input end of the single stage filter, wherein the combination of the low frequency and high frequency electronic filters cover the entire range of the vortex shedding frequency, and a single individual electronic filter is sitched on at one time when the measured frequency of the alternating electrical signal is equal to or greater than a threshold frequency assigned to the particular individual electronic filter that selectively transmits an alternating electrical signal oscillating at frequencies distributed within a band width about the threshold frequency. Of course, the individual electronic filter of the lowest frequency band stays normally switched on when no command signal is generated because of the absence of a detectable frequency of the alternating electrical signal at the output end of the single stage filter.

Yet a further object is to provide the parallel compound electronic filter described in the yet another object of the present invention, wherein the plurality of-low frequency electronic filters comprise a single pair of parallel filters respectively transmitting the alternating electrical signal in two adjacent lowest frequency ranges, which pair of parallel filters are controlled by the frequency of the alternating electrical signal detected at the output end of the single stage filter in comparison with a single threshold frequency in such a way that only one of the pair of parallel filters is switched on at one time, and the upper low frequency range filter of the pair of parallel filters becomes switched on when the measured frequency is equal to or greater than the threshold frequency and the lower low frequency range filter of the pair of parallel filters becomes switched on when the measured frequency is less than the threshold frequency or when there is no output signal with amplitude greater than zero or a preset minimum value from the single stage filter.

Still another object is to provide the parallel compound electronic filter described in the yet another object of the present invention, wherein the plurality of low frequency electronic filters have an over-ride control system backing up the regular control system using the command signal generated from the frequency of the alternating electrical signal measured at the output end of the single stage filter, which over-ride control system switches on and off the individual low frequency electronic filters in a sweep or scanning mode when the level of alternating electrical signal put into the single stage filter is greater than zero or a preset minimum value and the level of the alternating electrical signal put out from the single stage filter is equal to zero or less than a preset minimum value, and turns off the switching in the sweep or scanning mode as soon as the level of the alternating electrical signal put out from the single stage filter becomes greater than zero or the preset minimum value, whereupon the regular control system using the command signal generated from the frequency of the alternating electrical signal measured at the output end of the single filter takes over.

Still a further object is to provide the series and parallel compound electronic filters respectively described in the primary object and the yet another object of the present invention, which include an output signal cut-off switch that cuts off the alternating electrical signal put out from the compound electronic filter when the amplitude of the output alternating electrical signal from the first stage filter of the series compound electronic filter or the amplitude of the output alternating electrical signal from the single stage filter of the parallel compound electronic filter is less than a preset minimum value, and/or the frequency of the output alternating electrical signal from the second stage filter of the series compound electronic filter or the frequency of the output alternating electrical signal from the single stage filter of the parallel compound electronic filter is less than a preset minimum value, whereby the vortex flowmeter registers zero flow velocity instead of a non-zero false flow velocity when the flow velocity falls below a threshold velocity, below which threshold velocity the vortex flowmeter is not able to measure the flow velocity accurately and reliably.

These and other object of the present inventions will become further clear as the description of the inventions progresses.

BRIEF DESCRIPTION OF FIGURES

The present inventions may be described with a greater clarity and specificity by referring to the following figures.

DESCRIPTION OF THE ILLUSTRATED EMBODIMENTS

Figure 1:
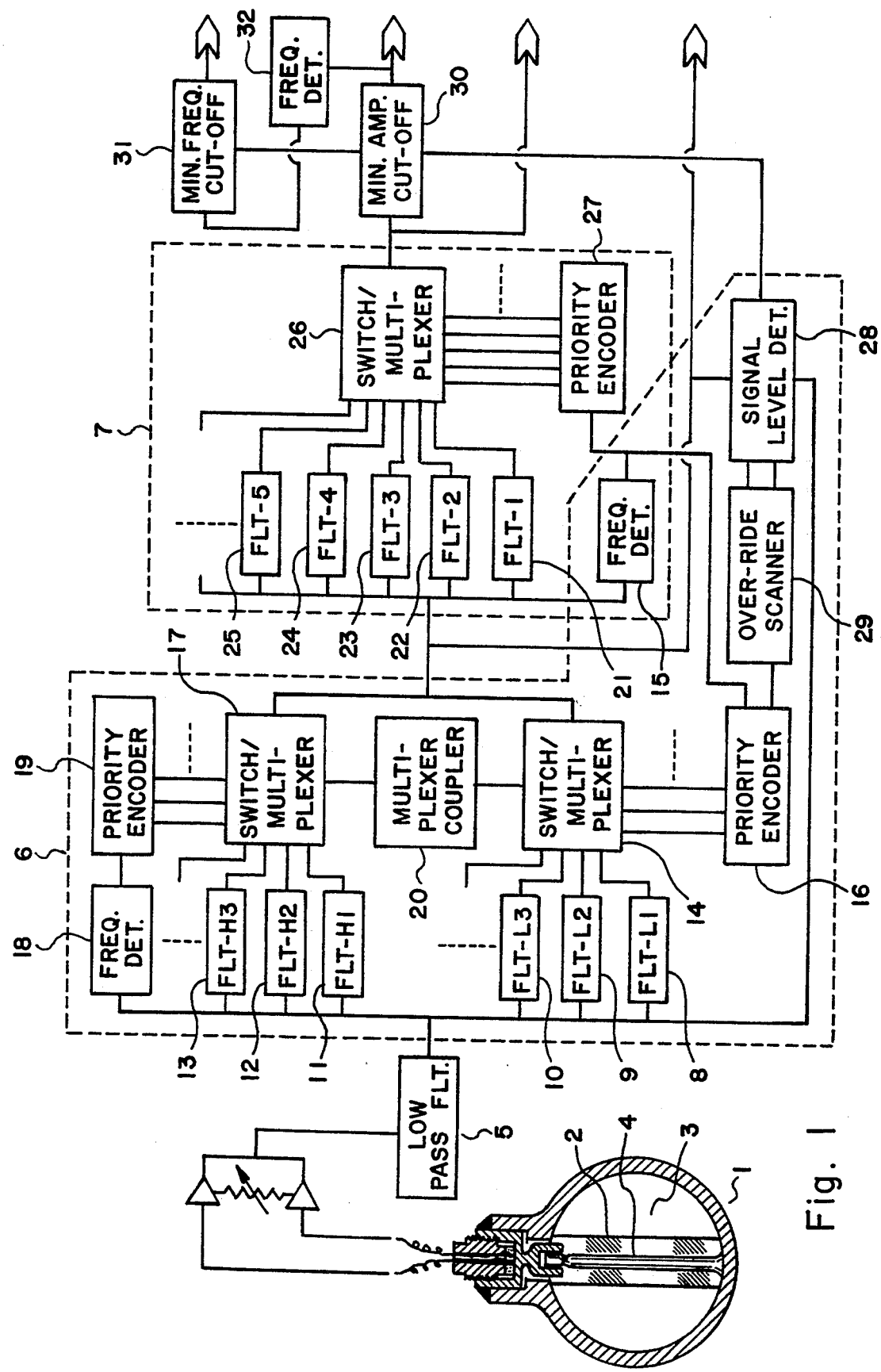
FIG. 1 illustrates a flow diagram showing the operating method and principles of a generalized version of the series compound electronic filter of the present invention.

In FIG. 1 there is illustrated a flow diagram of a generalized version of the series compound electronic filter conditioning an alternating electrical signal generated by the vortex shedding in a vortex flowmeter, that operates on the method and principles of the present invention. This version of the series compound electronic filter includes not only the absolutely necessary circuit elements required to condition the alternating electrical signal but also the accessorial circuit elements complementing the conditioning of the alternating electrical signal. The alternating electrical signal generated by the vortex shedding in a vortex flowmeter such as the particular illustrative embodiment 1 comprising a vortex generating bluff body 2 disposed across an upstream cross section of a flow passage 3 and a vortex sensing planar member 4 disposed across a downstream cross section of the flow passage 3, or other types of vortex flowmeters, is preconditioned by a low pass filter 5 or a band pass filter before being put into the series compound electronic filter of the present invention comprising a first stage filter 6 and a second stage filter 7. The preconditioning of the alternating electrical signal by the low pass filter 5 or a band pass filter gets rid of noise signals with frequencies distributed outside of the vortex frequency range. The first stage filter 6 comprises a parallel combination of a plurality of low frequency band pass filters 8, 9, 10, etc. wherein the lowest frequency band pass filter 8 may be a low pass filter, and a plurality of high frequency band pass filters 11, 12, 13, etc. wherein highest frequency band pass filter may be a high pass filter. This combination of the low and high frequency band pass filters covers the entire range of the vortex frequency range as the band width of each individual band pass filter extends into the band widths of adjacent individual filter or filters in a sharply decaying manner. A switch/multiplexer 14 switches on and off the individual low frequency band pass filters 8, 9, 10, etc. as directed by a command signal generated from the frequency of the alternating electrical signal measured at the output end of the first stage filter 6 by a frequency detector 15. A priority encoder 16 receives the information on the frequency of the alternating electrical signal detected by the frequency detector 15 in the form of a dc voltage and sends the command signal controlling the switching of the low frequency band pass filters 8, 9, 10, etc. to the switch/multiplexer 14. The priority encoder 16 has a plurality of threshold voltages respectively corresponding to a plurality of threshold frequencies respectively assigned to a plurality of switches included in the switch/multiplexer 14, which plurality of switches respectively switch on and off the plurality of low frequency band pass filters 8, 9, 10, etc. When the command dc voltage generated by the frequency detector 15 and sent to the priority encoder 16 is equal to or greater than a threshold voltage assigned to a particular individual low frequency band pass filter and less than a threshold voltage assigned to the adjacent higher frequency low frequency band pass filter, the particular low frequency band pass filter becomes switched on and stays switched on as long as the command dc voltage remains within the above-mentioned range, whereby the alternating electrical signal with frequencies distributed within the band width of the particular low frequency pass filter is selectively transmitted through the particular low frequency band pass filter, of which band width includes the threshold frequency corresponding to the threshold voltage assigned to the particular low frequency band pass filter. As a consequence, the lowest low frequency band pass filter 8 becomes switched on when the command dc voltage generated by the frequency detector 15 is equal to or greater than the threshold voltage assigned thereto or zero and less than the threshold voltage assigned to the second lowest low frequency band pass filter, and the second lowest low frequency band pass filter becomes switched on when the command dc voltage is equal to or greater than the threshold voltage assigned thereto and less than the threshold voltage assigned to the third lowest low frequency band pass filter, and so on. It must be mentioned that the priority encoder 16 switches on only one individual low frequency band pass filter at one time and switches off all of the remaining individual low frequency band pass filters, and that the lowest low frequency band pass filter stays normally switched on when there is no command voltage generated by the frequency detector 15 because of the absence of a frequency of any detectable level. The values of the threshold voltages are assigned to the various individual low frequency band pass filters 8, 9, 10, etc. in such a way that the threshold frequency corresponding to each threshold voltage assigned to a particular low frequency band pass filter is within the band width of the particular low frequency band pass filter, whereby an individual band pass filter switched on selectively transmits a component of the alternating electrical signal having frequencies distributed within the band width of the switched on individual band pass filter and blocks off all other components of the alternating electrical signal with frequencies distributed outside of the band width of the switched on individial band pass filter. The plurality of high frequency band pass filters 11, 12, 13, etc. are switched on and off one at a time by a switch/multiplexer 17 receiving a command dc voltage generated by the frequency of the alternating electrical signal measured at the input end of the first stage filter 6 by a frequency detector 18, which command dc voltage is processed by a priority encoder 19. The switching on and off of the high frequency band pass filters 11, 12, 13, etc. is controlled by the same method as that controls the switching of the low frequency band pass filters 8, 9, 10, etc. with one exception being that the command dc voltage controlling the high frequency band pass filters 11, 12, 13, etc. is generated from the frequency of the alternating electrical signal detected at the input end of the first stage filter 6, while the command dc voltage controlling the low frequency band pass filters 8, 9, 10, etc. is generated from the frequency of the alternating electrical signal detected at the output end of the first stage filter 6. The multiplexer coupler 20 performs a function that ensures only one individual band pass filter among the low frequency and high frequency band pass filters 8, 9, 10, 11, 12, 13, etc. is switched on at one time and all of the remaining individual band pass filters are switched off. It should be understood that the band width of each individual band pass filter included in the first stage filter 6 or in the second stage filter 7 extends beyond the range bounded by two threshold frequencies respectively corresponding to two threshold voltages defining the switch-on range of the particular individual band pass filter and, consequently, the entire range of the vortex shedding frequency is continuously covered by the band widths of the individual band pass filters constituting the electronic filter in a partially over-lapping relationship between each pair of adjacent bandwidths.

The second stage filter 7 included in the series compound electronic filter shown in FIG. 1 comprises a plurality of parallel band pass filters 21, 22, 23, 24, 25, etc., which are switched on and off one at a time by a switch/multiplexer 26 that receives a command dc voltage generated from the frequency of the alternating electrical signal measured at the output end of the first stage filter 6 and at the input end of the second stage filter 7 by the frequency detector 15, wherein the command dc voltage is processed by a priority encoder 27 in the same manner as that controlling the switching of the low frequency band pass filters 8, 9, 10, etc. As a matter of fact, the combination of band pass filters 21, 22, 23, 24, 25, etc. and the combination of the low frequency band pass filters 8, 9, 10, etc. are controlled by the same method as the two command dc voltages respectively controlling the two combinations of individual electronic filters are generated from the same frequency detector 15 detecting the frequency of the alternating electrical signal at a junction of the signal flow intermediate the first stage filter 6 and the second stage filter 7. The band width of each individual band pass filter included in the second stage filter 7 extends beyond the range bounded by two threshold frequencies respectively corresponding to two threshold voltages defining the switch-on range of the particular individual band pass filter and, consequently, the entire range of the vortex shedding frequency is continuously covered by the band widths of the individual band pass filters constituting the second stage filter 7 in a partially over-lapping relationship between each pair of adjacent band widths.

The single most important feature of the series compound electronic filter comprising the first stage filter 6 and the second stage filter 7 is that the command dc voltage controlling the low frequency band pass filters 8, 9, 10, etc. included in the first stage filter 6 is generated from the frequency of the alternating electrical signal measured at the output end of the first stage filter 6, while the command dc voltage controlling the band pass filters 21, 22, 23, 24, 25, etc. included in the second stage filter 7 is generated from the frequency of the alternating electrical signal measured at the input end of the second stage filter. In other words, the parallel combination of the low frequency band pass filters 8, 9, 10, etc. included in the first stage filter 6 and the parallel combination of the band pass filters 21, 22, 23, 24, 25, etc. included in the second stage filter 7 are controlled by the same frequency of the alternating electrical signal detected at a junction of the signal flow intermediate the first and second stage filters 6 and 7. It should be understood that, in general, it is very difficult to measure the vortex shedding frequency occurring at very low flow velocities, e.g., air flow under the standard condition lower than 15 feet per second or 5 meter per second, and water flow lower than 2 feet per second or 0.7 meter per second, without conditioning the alternating electrical signal generated by the vortex shedding by using a low frequency band pass filter with a narrow band width, because the noise signal created by mechanical vibrations of the vortex flowmeter and entrained in the alternating electrical signal has frequencies higher than the low vortex shedding frequency and causes the frequency detector generating the command dc voltage to lock on the high frequency of the noise signal instead of the low frequency of the vortex signal. As a consequence, when the command dc voltage generated by the frequency of the alternating electrical signal detected at the input end of a parallel filter bank is used to control the individual electronic filters included in the parallel filter bank, a wrong individual electronic filter assigned to a high frequency range is switched on instead of a right individual electronic filter assigned to a low frequency range including the low frequency of vortex signal. When the parallel filter bank is controlled by a command dc voltage generated from the frequency of the alternating electrical signal measured at the output end of the parallel filter bank, a wrong band pass filter switched on by a high frequency vortex signal or by a noise signal remains switched on and prevents a right band pass filter with a low frequency band from switching on even after the frequency of the vortex signal changes from a high value to a low value. Therefore, a parallel filter bank controlled indiscriminately by a command dc voltage exclusively generated by a common frequency of the alternating electrical signal measured only at the input end or only at the output end of the parallel filter bank does not work. The command dc voltage controlling a parallel filter bank cannot be generated from the amplitude of the alternating electrical signal wildly fluctuating in a low frequency range due to the interference between the vortex signal and the noise signal. The present invention teaches a unique and ingenious solution to the afore-mentioned problems by providing a first stage filter 6 comprising a parallel combination of a plurality of low frequency band pass filters 8, 9, 10, etc. and a plurality of high frequency band pass filters 11, 12, 13, etc. combined in a parallel arrangement, wherein the low frequency band pass filters 8, 9, 10, etc. are controlled by a command signal generated by the frequency of the alternating electrical signal filtered by the first stage filter 6 and the high frequency band pass filters 11, 12, 13, etc. are controlled by a command signal generated by the frequency of the alternating electrical signal unfiltered by the first stage filter 6, and by providing the second stage filter 7 including a plurality of band pass filters 21, 22, 23, 24, 25, etc. commonly controlled by a command dc voltage generated from the common frequency of the alternating electrical signal filtered by the first stage filter 6 and unfiltered by the second stage filter 7 as the alternating electrical signal filtered by the first stage filter 6 is clean enough to tap the information on the vortex shedding frequency for generating the command dc voltage therefrom. It should be understood that, in a high frequency range, the vortex signal is overwhelmingly larger than the noise signal and, consequently, the vortex shedding frequency can be taken from the alternating electrical signal unfiltered by the first stage filter 6 to generate the command dc voltage controlling the high frequency band pass filters 11, 12, 13, etc., while the vortex shedding frequency has to be taken from the alternating electrical signal filtered by the first stage filter 6 to generate the command dc voltage controlling the low frequency band pass filters 8, 9, 10, etc. in a low frequency range wherein the amplitudes of the vortex signal and the noise signal are comparable to one another and the frequency of the unfiltered alternating electrical signal is much greater than the frequency of the vortex shedding. The particular method of controlling the first and second stage filters 6 and 7 works because of the following two features: Firstly, only one of the individual electronic filters included in each of the first and second stage filters must be switched on at one time and all of the remaining individual filters must be switched off. Secondly, the lowest frequency band pass filter included in each of the first and second stage filters must be normally switched on when there is no command dc voltage because of the absence of a frequency of the alternating electrical signal with any detectable level. It is generally required that the transmitting efficiency of each of the low frequency band filters 8, 9, 10, etc. must decay down rapidly enough in a frequency range outside of the band width of each of the low frequency band pass filters and yet must remain at finitely small and nonzero values in the frequency range covered by the combination of the low frequency band pass filters 8, 9, 10, etc. when the first stage filter 6 does not include an over-ride control system comprising a signal level detector 28 and a over-ride scanner 29, whereby the vortex signal occurring at a frequency within the low frequency range covered by the combination of the low frequency band pass filters 8, 9, 10, etc. becomes transmitted through the first stage filter 6 at least at a detectable level at all instants whereby the frequency of the alternating electrical signal filtered by the first stage filter 6 can be detected to generate the command dc voltage controlling the individual filters included in the first stage filter 6. When the transmitting efficiency of each of the low frequency band pass filters 8, 9, 10, etc. decays down sharply to very small values or zero outside the band width of each of the low frequency band pass filters 8, 9, 10, etc., an over-ride control system comprising a signal level detector 28 and an over-ride scanner 29 may be included in order to ensure that the switching on and off of the low frequency band pass filters 8, 9, 10, etc. is executed in the mode tracking the varying flow velocity. The over-ride control system automatically takes over the switching on and off of the low frequency band pass filters 8, 9, 10, etc. when the level of the input signal to the first stage filter 6 is greater than a preset minimum value and the level of the output signal from the first stage filter 6 is less than a preset minimum value, which condition is detected by the signal level detector 28, whereupon the over-ride scanner 29 puts out a series of ramp dc voltage starting with zero value and ending with a maximum value equal to or greater than the largest threshold voltage assigned to the highest frequency low frequency band pass filter. The priority encoder 16 receiving the ramp dc voltage from the over-ride scanner 29 successively switches on and off the low frequency band pass filters 8, 9, 10, etc. one at a time starting with the lowest low frequency band pass filter and ending with the highest low frequency band pass filter, which switching in the sweep or scanning mode is repeated until the signal level detector 28 detects the output signal from the first stage filter 6 having a level equal to or greater than the preset minimum value. As soon as a level of the output signal from the first stage filter 6 greater than the preset minimum value is detected, the over-ride control system generating the ramp dc voltage is shut off, whereupon the regular control system generating the command dc voltage from the frequency of the alternating electrical signal measured at the output end of the first stage filter 6 takes over. The control of the high frequency band pass filters 11, 12, 13, etc. included in the first stage filter 6 as well as the control of the band pass filters 21, 22, 23, 24, 25. etc. included in the second stage filter 7 does not require an over-ride control system, as the command dc voltage generated from the frequency of the alternating electrical signal taken at the input end of the respective parallel filter bank reliably tracks the varying flow velocity because the vortex signal is overwhelmingly larger than the noise signal in the high frequency range covered by the high frequency band pass filters 11, 12, 13, etc. included in the first stage filter 6 and because the output alternating electrical signal from the first stage filter 6 comprises mostly the vortex signal.

The series compound electronic filter shown in FIG. 1 works best when the first stage filter 6 comprises a small number of band pass filters respectively having broad band widths, while the second stage filter 7 comprises a sizable number of band pass filters respectively having narrow band widths. In a modified version of the series compound electronic filter, the high frequency band pass filters 11, 12, 13, etc. may be omitted from the first stage filter 6 wherein the entire range of the vortex shedding frequency is now covered by the low frequency band pass filters 8, 9, 10, etc. as exemplified by the embodiment shown in FIG. 2. In order to prevent a vortex flowmeter from registering false value of the flow velocity in a low velocity range wherein the noise signal is greater than the vortex signal, a minimum amplitude cut-off circuit 30 may be included at the output end of the second stage filter 7, which automatically cuts off the the output signal from the second stage filter when the level of the input signal to the second stage filter 7 measured at the output end of the first stage filter 6 by the signal level detector 28 falls below a preset minimum value, below which preset minimum value the vortex signal and the noise signal become indistinguishable from one another. The preset minimum value of the alternating electrical signal put into the second stage filter 7, that defines the minimum measurable flow velocity, may be adjusted in the field in accordance with the noise level existing in the specific working environment. A minimum frequency cut-off circuit 31 may be also included in series with and the output end of the minimum amplitude cut-off circuit 30, wherein the minimum frequency cut-off circuit 31 cuts of the output signal from the second stage filter 7 when the frequency of the alternating electrical signal put out by the second stage filter 7, that is measured by a frequency detector 32, falls below a preset minimum value that may be adjusted in the field according to the noise level existing in the specific working environment. It should be understood that the minimum amplitude and minimum frequency cut-off circuits 30 and 31 are accessory elements, which are not essential components of the series compound electronic filter.

Figure 2:
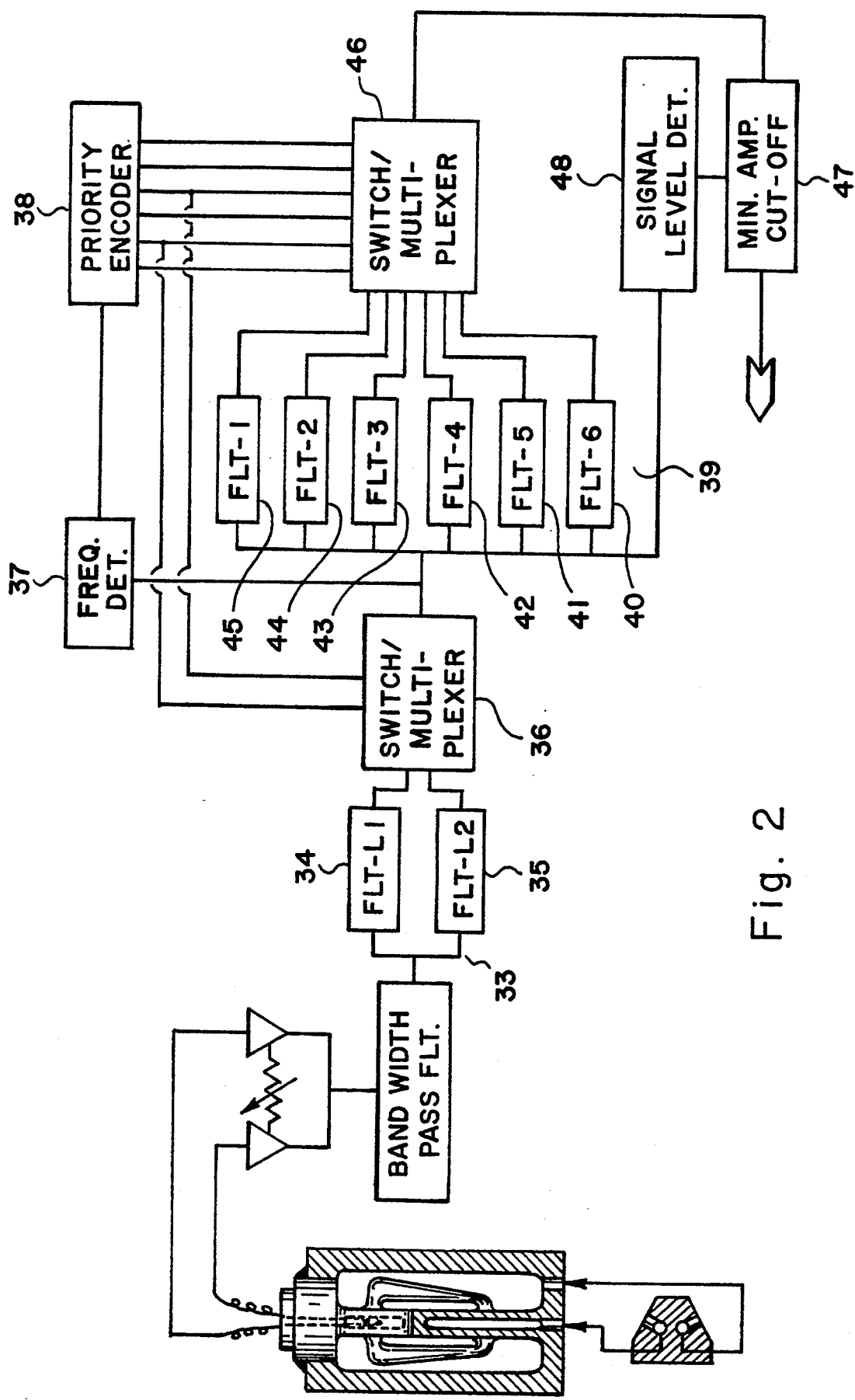
FIG. 2 illustrates a flow diagram showing the operating method and principles of a simplified and economized version of the series compound electronic filter shown in FIG. 1.

In FIG. 2 there is illustrated a flow diagram of a simplified and economized version of the series compound electric filter show and described in conjunction with FIG. 1. In this embodiment, the first stage filter 33 equivalent to the first stage filter 6 shown in FIG. 1 includes only two band pass filters 34 and 35 respectively covering low and high range of the vortex shedding frequencies, which are controlled by the command signal generated by the combination of the switch/multiplexer 36, the frequency detector 37 detecting the frequency of the alternating electrical signal at the output end of the first stage filter 33 and the priority encoder 38 in the same manner as that controlling the low frequency band pass filters 8, 9, 10, etc. shown and described in conjunction with FIG. 1. The priority encoder has a built-in control logic that automatically switches on one of the two band pass filters 4 and 35 when the other thereof is switched off, wherein the lowest frequency band pass filter 34 normally stays switched on when there is no detectable frequency of the output signal from the first stage filter 33. The second stage filter 39 equivalent to the second stage filter 7 shown in FIG. 1, that includes a plurality of band pass filters 40–45, etc. is controlled by the combination of the frequency detector 37 detecting the frequency of the alternating electrical signal at the output end of the first stage filter 33 and at the input end of the second stage filter 39, the priority encoder 38 and a switch/multiplexer 46 in the same manner as that described in conjunction with FIG. 1. A minimum amplitude cut-off circuit 47 controlled by the signal level of the alternating electrical signal measured by the signal level detector 48 at the input end of the second stage filter 39 may be included as an accessory element complimenting the over all performance of the series compound electronic filter.

Figure 3:
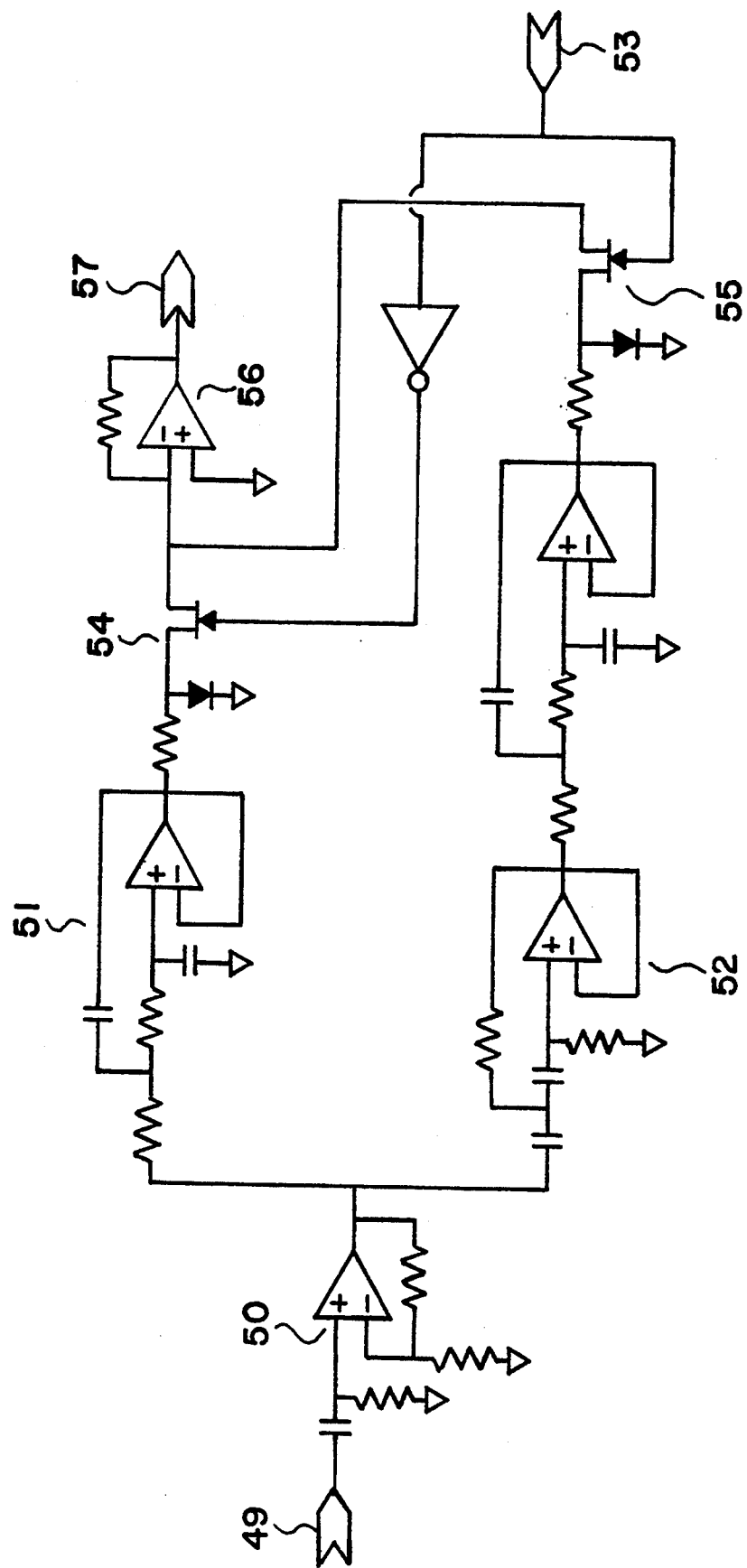
FIG. 3 illustrates a structural embodiment of the first stage filter included in the series compound electronic filter shown in FIG. 2

In FIG. 3 there is illustrated a structural embodiment of the first stage filter 33 included in the embodiment shown in FIG. 2, that includes only two band pass filters. The alternating electrical signal 49 preconditioned by a band pass filter or low pass filter such as the element 5 included in the embodiment shown in FIG. 1 is routed through a high pass filter-amplifier 50 and put into the first stage filter comprising a low frequency band pass filter or low pass filter 51 and a high frequency band pass filter 52, wherein the band pass filter 51 covers a minor low frequency end portion of the vortex frequency range, while the band pass filter 53 covers the remaining major portion of the vortex frequency range. The command signal 53 provided by the priority encoder 38 shown in FIG. 2 in the form of dc voltage generated by the frequency of the alternating electrical signal measured at the output end of the first stage filter controls the JFET switches 54 and 55 in such a way that the JFET switch 54 is switched on when the dc voltage 53 is equal to or greater than zero or a preset value and less than a threshold value VREF stored in the priority encoder, and the JFET switch 55 is switched on when the dc voltage 53 is equal to or greater than the threshold value VREF. The JFET switch 54 is automatically switched on when the JFET switch 55 becomes switched off. The inverting amplifier 56 is a complementary circuit to the JFET switches, through which the output signal 57 is routed.

Figure 4:
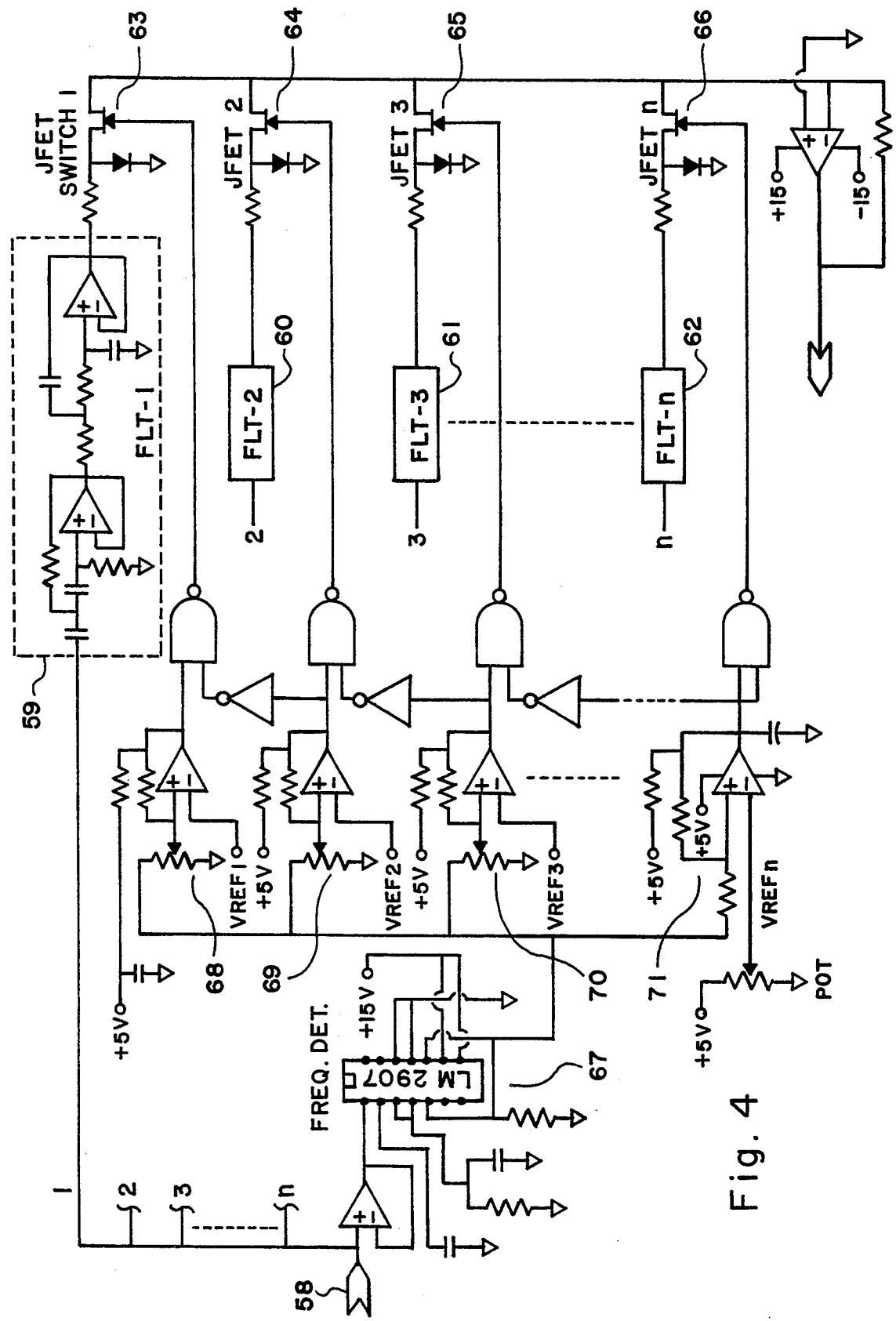
FIG. 4 illustrates a structural embodiment of the second stage filter included in the series compound electronic filter shown in FIG. 1 or 2.

In FIG. 4 there is illustrated a structural embodiment of the second stage filter comprising the band pass filters 21–25 or the band pass filters 40–45 included in the embodiment shown in FIG. 1 or 2. The output signal 58 from the first stage filter is put into the second stage filter comprising a plurality of band pass filters 59, 60, 61, 62, etc. respectively switched on and off by a plurality of JFET switches 63, 64, 65, 66, etc. The frequency detector 67 takes the frequency of the alternating electrical signal 58 at the input end of the second stage filter and converts to the command signal in the form of dc voltage supplied to a plurality of comparators 68, 69, 70, 71, etc. included in priority encoder such as the element 26 shown in FIG. 1 or the element 38 shown in FIG. 2. Each of the comparators 68, 69, 70, 71, etc. has a threshold voltage VREF's stored therein, which threshold voltage respectively represent a frequency within the band width of each of the plurality of band pass filters. When the dc voltage supplied from the frequency detector 67 to the comparators 68, 69, 70, 71, etc. is less than a threshold voltage stored in a particular comparator and equal to or greater than a threshold voltage stored in the immediately adjacent band pass filter on the lower frequency side, the particular comparator delivers a command signal switching on a JFET switch assigned to a particular band pass filter with a band width about a representative frequency corresponding to the threshold voltage stored in the particular comparator. It is clear that only one band pass filter is switched on at one time, as all of the remaining band pass filters stay switched off, and that the lowest frequency band pass filter 59 stays switched on when the frequency detector 67 does not detect any frequency greater than a preset value or zero. It becomes immediately clear that the same circuit as that shown in FIG. 4 can be used to control the low frequency band pass filters 8, 9, 10, etc. and the high frequency band pass filters 11, 12, 13, etc. included in the first stage filter employed in the embodiment shown in FIG. 1. Of course, the frequency detector equivalent to the circuit 67 must be connected to the output lead wire of the first stage filter instead of the input lead wire thereof in the control of the low frequency band pass filters 8, 9, 10, etc.

Figure 5:
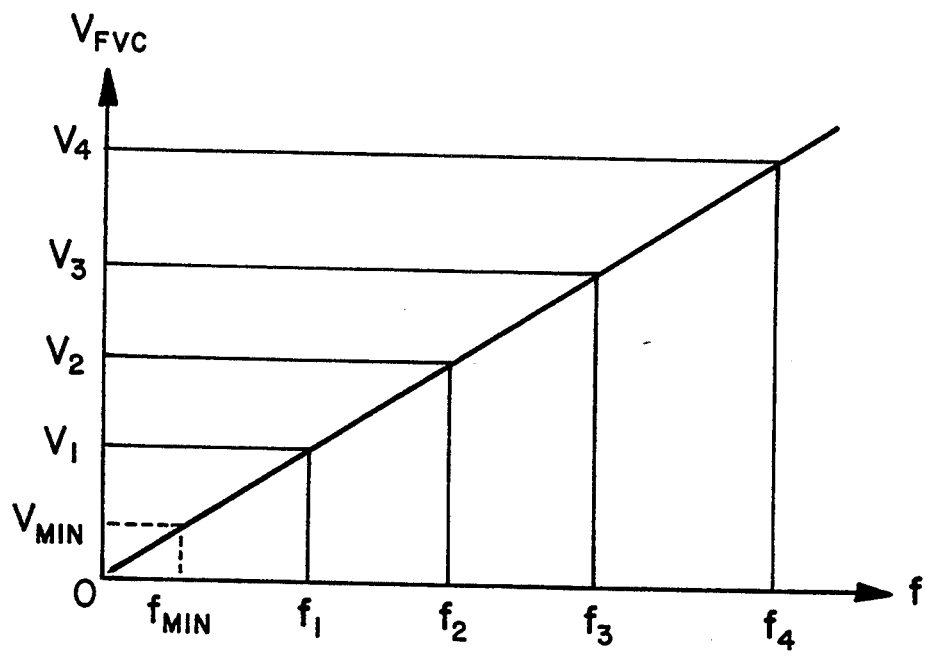
FIG. 5 illustrates the principles of control switching on and off of the individual electronic filters included in the first or second stage filter of the series compound electronic filter shown in FIG. 1 or 2.

In FIG. 5 there is illustrated a relationship between the frequency f of the alternating electrical signal and the command signal $V_{FVC}$ generated by the frequency of the alternating electrical signal. The plurality of band pass filters have band width respectively defined by the intervals bounded by $f_{min}$ (or zero) and $f_1$, $f_1$ and $f_2$, $f_2$ and $f_3$, $f_3$ and $f_4$, etc. The plurality of comparators have the threshold voltage values VREF respectively equal to $V_1$, $V_2$, $V_3$, $V_4$, etc. It is readily realized that, for example, when the dominant or representative frequency of the alternating electrical signal is in the range bounded by $f_{MIN}$ and $f_1$, that is equal to the band width of the lowest frequency band pass filter, the command signal dc voltage is in the range bounded by $V_{MIN}$ and $V_1$ and, consequently, the lowest band pass is switched on, while all other remaining band pass filters remain switched off. As a consequence, a component of the alternating electrical signal with the particular dominant or representative frequency is transmitted through the compound electronic filter, while all other components with frequencies different from the particular dominant or representative frequency are blocked off by the compound electronic filter. Of course, the component signal with the dominant frequency is the vortex signal and the other components with frequencies different from the dominant frequency are noise. Therefore, the compound electronic filter blocks off noise and selectively transmits the vortex signal.

Figure 6:
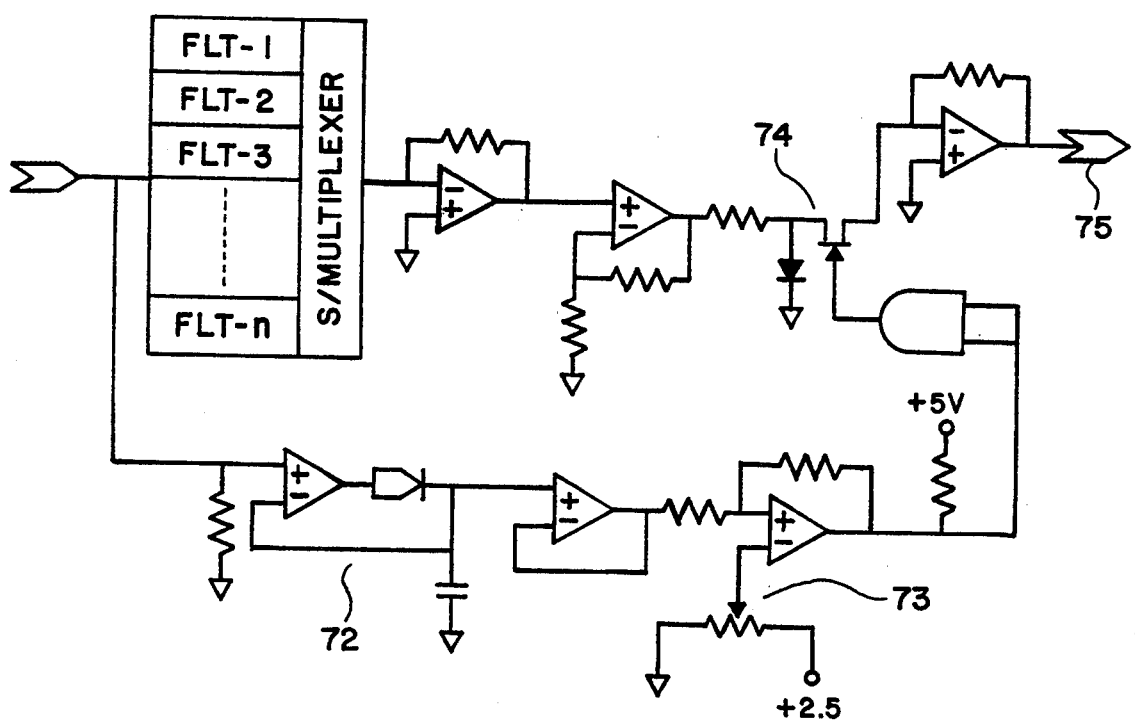
FIG. 6 illustrates a structural embodiment of the amplitude cut-off switch that cuts off the output signal from the series compound electronic filter when the amplitude of the output signal from the first stage filter included in the series compound electronic filter is less than a preset minimum value.

In FIG. 6 there is illustrated a structural embodiment of the minimum amplitude cut-off circuit comprising the combination of the elements 28 and 30 shown in FIG. 1 or the combination of the elements 47 and 48 shown in FIG. 2. The signal level detector 72 detects the level of the alternating electrical signal at the input end of the first or second stage filter, and a comparator 73 compares the level of the input alternating electrical signal with a preset reference value. When the level of the input signal to the filter bank is less than the preset reference value stored in the comparator 73, the comparator 73 sends a command signal to a JFET switch 74, that shuts off the JFET switch 74, thereby cutting off the output signal 75. By presetting the reference value equal to a value corresponding to the minimum measurable velocity of fluid flow, the vortex flowmeter is tuned in such a way that it measures fluid velocities equal to or greater than the preset minimum value and registers zero value when the fluid velocity is less than the preset minimum value.

Figure 7:
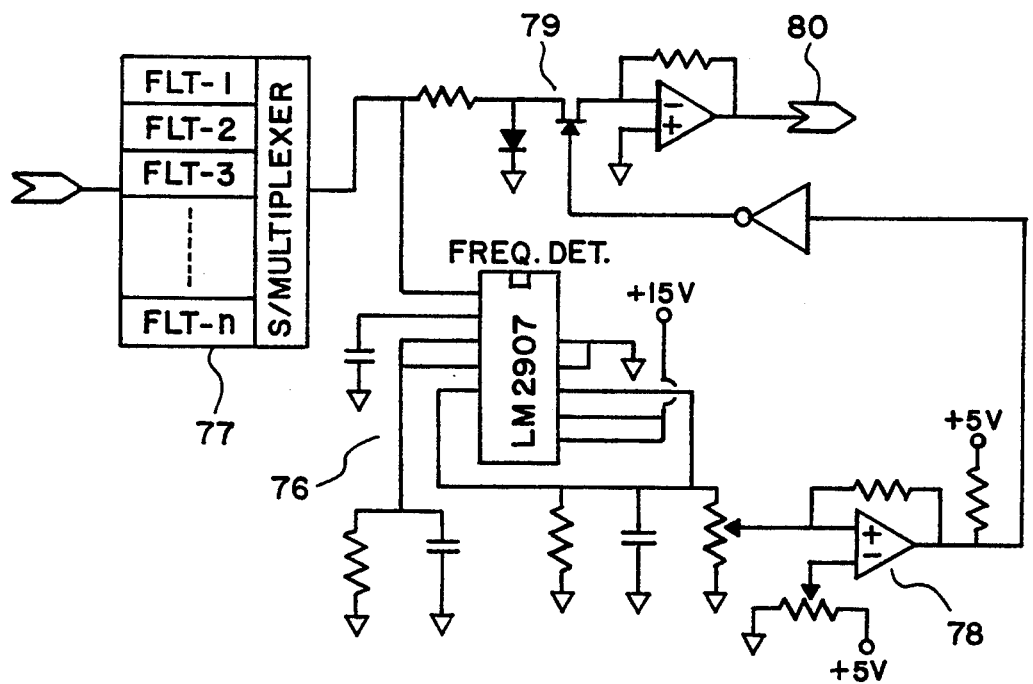
FIG. 7 illustrates a structural embodiment of the frequency cut-off switch that cuts off the output signal from the series compound electronic filter when the frequency of the output signal from the second stage filter included in the series compound electronic filter is less than a preset minimum value.

In FIG. 7 there is illustrated a structural embodiment of the minimum frequency cut-off circuit such as the combination of the elements 31 and 32 shown in FIG. 1. The frequency detector 76 detects the frequency of the output signal from the second stage filter 77, which frequency is converted to a dc voltage and sent to a comparator 78. When the dc voltage generated by the frequency of the alternating electrical signal falls below a preset reference value stored in the comparator 78, the comparator 78 sends a command signal to the JFET switch 79 that cuts off the output signal 80. By presetting the reference value equal to a value corresponding to the minimum measurable velocity of fluid flow, the vortex flowmeter is made to read zero value instead of a false output caused by the noise entrained in the alternating electrical signal when the fluid velocity falls below the preset minimum value. It is generally true that the noise signal has a higher frequency than the frequency of the vortex signal in the lower end of the vortex frequency range and, consequently, the minimum frequency cut-off circuit has tendency to operate under a false command signal generated by the frequency of the noise signal instead of the frequency of the vortex signal in cutting of the output signal. Therefore, it is preferred that the minimum amplitude cut-off circuit is employed independently or in conjunction with the minimum frequency cut-off circuit installed at the output end of the minimum amplitude cut-off circuit.

Figure 8:
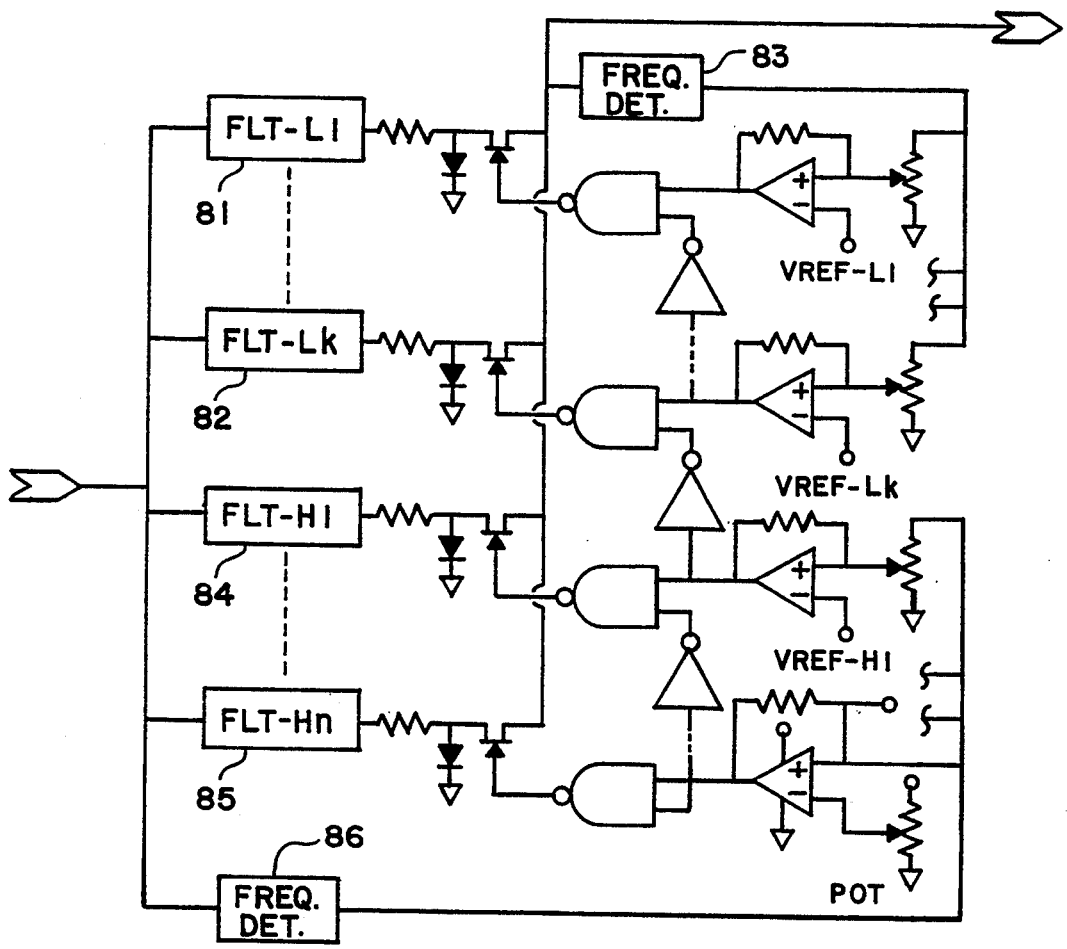
FIG. 8 illustrates a structural embodiment of the parallel compound electronic filter of the present invention, that can be used as an independent filter or as the first stage filter included in the series compound electronic filter shown in FIG. 1.

In FIG. 8 there is illustrated a structural embodiment of the parallel compound electronic filter comprising a single stage filter including a plurality of low frequency band pass filters 81, 82, etc. controlled by the frequency of the alternating electrical signal measured by a frequency detector 83 at the output end of the single stage filter, and a plurality of high frequency filters 84, 85, etc. controlled by the frequency of the alternating electrical signal measured by a frequency detector 86 at the input end of the single stage filter. This embodiment of the parallel compound electronic filter has essentially the same construction and operates on essentially the same principles as those of the first stage filter 6 included in the embodiment of the series compound electronic filter. The combination of the low frequency band pass filters 81, 82, etc. may include a single pair of band pass filters similar to the combination shown in FIG. 3, while the combination of the high frequency band pass filters 84, 85, etc. may include a plurality of band pass filters similar to the combination shown in FIG. 4. The particular illustrative embodiment of the parallel compound electronic filter works best, when it includes a over-ride control system such as that shown and described in conjunction with FIGS. 1 and 9.

Figure 9:
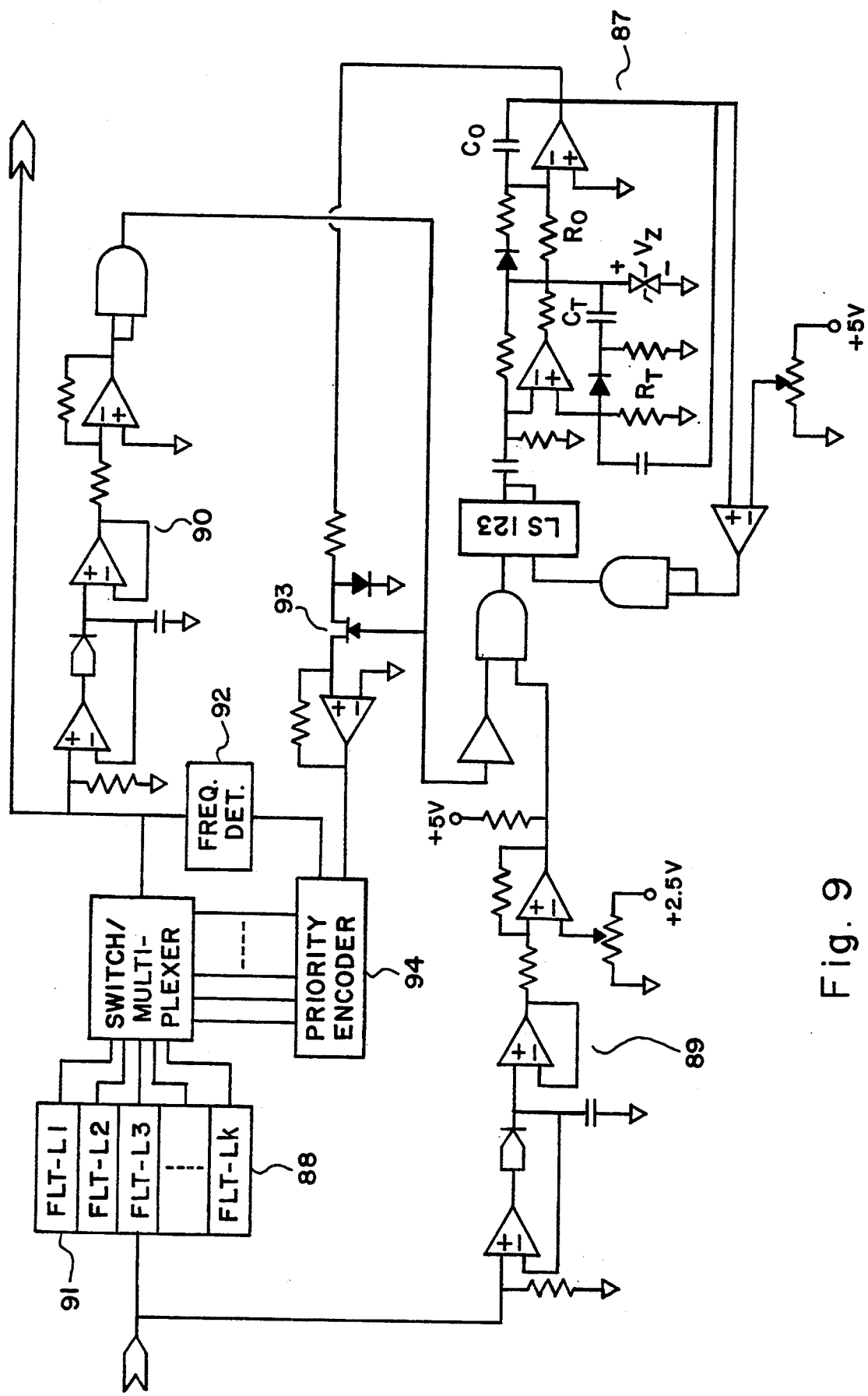
FIG. 9 illustrates a structural embodiment of the over-ride control system backing up the regular control system switching on and off of the plurality of low frequency filters included in the first stage filter of the series compound electronic filter shown in FIG. 1 or in the parallel compound electronic filter shown in FIG. 8, that switches on and off the individual low frequency filters in a sweep or scanning mode when the level of the output signal from the first stage filter included in the series compound electronic filter shown in FIG. 1 or from the parallel compound electronic filter shown in FIG. 8 is less than a preset minimum value, and turns off the switching in the sweep or scanning mode as soon as the level of the output signal becomes equal to or greater than the preset minimum value.

In FIG. 9 there is illustrated a structural embodiment of the over-ride control system providing a backup control means that switches on and off the plurality of low frequency band pass filters 8, 9, 10, etc. included in the first stage filter 6 employed in the embodiment shown in FIG. 1, or the plurality of low frequency band pass filters 81, 82, etc. included in the single stage filter shown in FIG. 8. A ramp generator 87 generates a series of a ramp voltage increasing from zero to a maximum value at least equal to or greater than the maximum threshold value assigned to the switching of the highest frequency low frequency band pass filter 88, when an input signal level detector 89 detects a level of the input signal greater than zero or a preset minimum value and an output signal level detector 90 detects a level of the output signal equal to zero or less than a preset minimum value. It is evident that such a ramp voltage switches on and off the plurality of low frequency band pass filters 88–91 one at a time in a sweeping or scanning mode starting with the lowest frequency low frequency band pass filter 91 and ending with the highest frequency low frequency band pass filter 88, which sequential switching on and off of the individual low frequency band pass is repeated as long as the output signal level detector 90 fails to detect the output greater than zero or the preset minimum value. As soon as the output signal level detector 90 detects a signal greater than zero or the preset minimum value, a JFET switch 93 shuts off the over-ride control system, whereupon the low frequency band pass filters 88–91 are controlled by the command signal generated by the combination of a frequency detector 92 and a priority encoder 94, that operates on the same principles as the method controlling the low frequency band pass filters 8, 9, 10, etc. shown and described in conjunction with FIG. 1. In the particular illustrative embodiment, the over-ride control system comprising the signal level detectors 89 and 90, and the ramp voltage generator 87 turns on when the input signal to the parallel bank of low frequency band pass filters 88–91 is greater than zero or a preset minimum value and the output signal from the parallel bank of low frequency band pass filters 88–91 is equal to zero or less than a preset minimum value, and turns off as soon as the output signal from the parallel bank of the low frequency band pass filters 88–91 registers a value greater than zero or the preset minimum value. In a modified version of the particular illustrative embodiment, the signal level detector 89 may be omitted and the control of the ramp voltage generator 87 can be modifies in such a way that the ramp generator 87 turns on when the output signal level detector 90 does not register a signal level equal to zero or greater than a preset minimum value, and turns off as soon as the output signal level detector 90 registers a signal level greater than zero or the preset minimum value.

The alternating electrical signal generated by the vortex shedding in a flowmeter and conditioned by the series or parallel compound electronic filter of the present invention is sent to a data processor that not shown in the illustrative embodiment, which data processor determines the fluid velocity as a function of the frequency of the conditioned form of the alternating electrical signal. The use of the compound electronic filter of the present invention enables a well designed vortex flowmeter to measure air flows under the standard condition as low as 3 feet per second or 1 meter per second, and water flows as low as 0.3 feet per second or 0.1 meter per second. It should be understood that one of the individual filters covering the highest frequency band included in the parallel bank of the electronic filters included in the series or parallel compound electronic filter may be a plain lead wire providing a by-pass circuit around the parallel bank of the electronic filters. The over-ride control system backing up the regular control system switching on and off the individual filters included in the parallel bank of filters may take over when there is a detectable input signal and no detectable output signal from the parallel bank of filters, or when there is no detectable output signal from the parallel bank of filters.

While the principles of the present inventions have now been made clear by the illustrative embodiments shown and described, there will be many modifications of the methods, structures, arrangements, proportions, elements and materials, which are immediately obvious to those skilled in the art and particularly adapted to the specific working environments and operating conditions in the practice of the inventions without departing from those principles. It is not desired to limit the inventions to the particular illustrative embodiments shown and described and accordingly all suitable modifications and equivalents may be regarded as falling within the scope of the inventions as defined by the claims which follow.

The embodiments of the inventions, in which an exclusive property or privilege is claimed, are defined as follows:

1. A method for conditioning an alternating electrical signal generated by vortex shedding in a vortex flowmeter, comprising in combination:
   a) supplying an input signal representing the vortex shedding to a first stage filter including a parallel combination of a first plurality of electronic filters respectively including a first plurality of electronic switches, wherein each of the first plurality of electronic filters has a different band width and selectively transmits an alternating electrical signals having frequencies distributed substantially within the band width of said each electronic filter, and one of the first plurality of electronic switches closes when a first command signal controlling the first plurality of electronic switches is generated from frequencies of the alternating electrical signal falling substantially within the band width of one of the first plurality of electronic filters controlled by said one electronic switch, and stays open when the first command signal is generated from frequencies of the alternating electrical signal falling substantially outside of the band width of said one of the first plurality of electronic filters controlled by said one electronic switch;
   b) converting a frequency of an output signal from the first stage filter to the first command signal;
   c) supplying said output signal from the first stage filter to a second stage filter including a parallel combination of a second plurality of electronic filters respectively including a second plurality of electronic switches, wherein each of the second plurality of electronic filters has a different band width band selectively transmits an alternating electrical signal having frequencies distributed substantially within the band width of said each electronic filter, and one of the second plurality of electronic switches closes when a second command signal controlling the second plurality of electronic switches is generated from frequencies of the alternating electrical signal falling substantially within the band width of one of the second plurality of electronic filters controlled by said one electronic switch, and stays open when the second command signal is generated from frequencies of the alternating electrical signal falling substantially outside of the band width of said one of the second plurality of electronic filters controlled by said one electronic switch;
   d) converting the frequency of said output signal from the first stage filter to the second command signal; and
   e) obtaining an output signal from the second stage filter as a refined alternating electrical signal representing the vortex shedding in the vortex flowmeter.

2. A method as defined in claim 1 that generates an over-ride command signal backing up the first command signal in controlling the first plurality of electronic switches, wherein the over-ride command signal takes over when a level of said output signal from the first stage filter is less than a preset value and switches on and off the first plurality of electronic switches one at a time in a sweep mode until the level of said output signal from the first stage filter becomes greater than the preset value, and the over-ride command signal shuts off as soon as the level of said output signal from the first stage filter becomes greater than the preset value.

3. A method as defined in claim 2 that generates the over-ride command signal when the level of said output signal from the first stage filter is less than the preset value and a level of said input signal supplied to the first stage filter is greater than a preset value, and the over-ride command signal shuts off as soon as the level of said output signal from the first stage filter becomes greater than the preset value.

4. A method as defined in claim 1 that cuts off said output signal from the second stage filter when a level of said output signal from the first stage is less than a preset minimum value.

5. A method as defined in claim 1 that cuts off said output signal from the second stage filter when a frequency of said output signal from the second stage filter is less than a preset minimum value.

6. A method for conditioning an alternating electrical signal generated by vortex shedding in a vortex flowmeter, comprising in combination:
   a) supplying an input signal representing the vortex shedding to a filter including a parallel combination of a first plurality of electronic filters respectively having a first plurality of electronic switches and a second plurality of electronic filters respectively having a second plurality of electronic switches, said first plurality of electronic filters covering a low frequency range and said second plurality of electronic filters covering a high frequency range of vortex shedding frequencies, wherein each of said electronic filters included in said a filter has a different band width and selectively transmits an alternating electrical signal having frequencies distributed substantially within the band width of said each electronic filter, and the first and second plurality of electronic switches are respectively controlled by a first and second command signal in a relationship wherein one of said electronic switches included in said a filter closes when one of the first and second command signal controlling said one electronic switch is generated from frequencies of the alternating electrical signal falling substantially within the band width of one of said electronic filters controlled by said one electronic switch, and stays open when said one of the first and second command signal controlling said one electronic switch is generated from frequencies of the alternating electrical signal falling substantially outside of the band width of said one of said electronic filters controlled by said one electronic switch;

b) converting a frequency of an output signal from said a filter to the first command signal;

c) converting a frequency of said input signal supplied to said a filter to the second command signal; and d) obtaining said output signal from said a filter as a refined alternating electrical signal representing the vortex shedding in the vortex flowmeter.

7. A method as defined in claim 6 that generates an over-ride command signal backing up the first command signal in controlling the first plurality of electronic switches, wherein the over-ride command signal takes over when a level of said output signal from said a filter is less-than a preset value and switches on and off the first plurality of electronic switches one at a time in a sweep mode until the level of said output signal from said a filter becomes greater than the preset value, and the over-ride command signal shuts off as soon as the level of said output signal from said a filter becomes greater than the preset value.

8. A method as defined in claim 7 that generates the over-ride command signal when the level of said output signal from said a filter is less than the preset value and a level of said input signal supplied to said a filter is greater than a preset value, and the over-ride command signal shuts off as soon as the level of said output signal from said a filter becomes greater than the preset value.

9. A method as defined in claim 6 that supplies said output signal from said a filter to another filter including:

a) a parallel combination of a third plurality of electronic filters respectively including a third plurality of electronic switches, wherein each of the third plurality of electronic filters has a different band width and selectively transmits an alternating electrical signal having frequencies distributed substantially within the band width of said each electronic filter, and one of the third plurality of electronic switches closes when a third command signal controlling the third plurality of electronic switches is generated from frequencies of the alternating electrical signal falling substantially within the band width of one of the third plurality of electronic filters controlled by said one electronic switch, and stays open when the third command signal is generated from frequencies of the alternating electrical signal falling substantially outside of the band width of said one of the third plurality of electronic filters controlled by said one electronic switch;

b) converting the frequency of said output signal from said a filter to the third command signal; and c) obtaining an output signal from said another filter as a further refined alternating electrical signal representing the vortex shedding in the vortex flowmeter.

10. A method as defined in claim 9 that generates an over-ride command signal backing up the first command signal in controlling the first plurality of electronic switches, wherein the over-ride command signal takes over when a level of said output signal from said a filter is less than a preset value and switches on and off the first plurality of electronic switches one at a time in a sweep mode until the level of said output signal from said a filter becomes greater than the preset value, and the over-ride command signal shuts off as soon as the level of said output signal from said a filter becomes greater than the preset value.

11. A method as defined in claim 10 that generates the over-ride command signal when the level of said output signal from said a filter is less than the preset value and a level of said input signal supplied to said a filter is greater than a preset value, and the over-ride command signal shuts off as soon as the level of said output signal from said a filter becomes greater than the preset value.

12. An apparatus for conditioning an alternating electrical signal generated by vortex shedding in a vortex flowmeter, comprising in combination:

a) a first stage filter receiving an input signal representing the vortex shedding, including a parallel combination of a first plurality of electronic filters respectively including a first plurality of electronic switches, wherein each of the first plurality of electronic filters has a different band width and selectively transmits an alternating electrical signal having frequencies distributed substantially within the band width of said each electronic filter, and one of the first plurality of electronic switches closes when a first command signal controlling the first plurality of electronic switches is generated from frequencies of the alternating electrical signal falling substantially within the band width of one of the first plurality of electronic filters controlled by said one electronic switch, and stays open when the first command signal is generated from frequencies of the alternating electrical signal falling substantially outside of the band width of said one of the first plurality of electronic filters controlled by said one electronic switch;

b) means for converting a frequency of an output signal from the first stage filter to the first command signal;

c) a second stage filter receiving said output signal from the first stage filter, including a parallel combination of a second plurality of electronic filters respectively including a second plurality of electronic switches, wherein each of the second plurality of electronic filters selectively transmits a portion of an alternating electrical signal having frequencies distributed substantially within the band width of said each electronic filter, and one of the second plurality of electronic switches closes when a second command signal controlling the second plurality of electronic switches is generated from frequencies of the alternating electrical signal falling substantially within the band width of one of the second plurality of electronic filters controlled by said one electronic switch, and-stays open when the second command signal is generated from frequencies of the alternating electrical signal falling substantially outside of the band width of said one of the second plurality of electronic filters controlled by said one electronic switch;

d) means for converting the frequency of said output signal from the first stage filter to the second command signal; and e) means for providing an output signal from the second stage filter as a refined alternating electrical signal representing the vortex shedding in the vortex flowmeter.

13. An apparatus as defined in claim 12 wherein said combination .includes means for generating an over-ride command signal backing up the first command signal in controlling the first plurality of electronic switches in a relationship wherein the over-ride command signal takes over when a level of said output signal from the first stage filter is less than a preset value and switches on and off the first plurality of electronic switches one at a time in a sweep mode until the level of said output signal from the first stage filter becomes greater than the preset value, and the over-ride command signal shuts off as soon as the level of said output signal from the first stage filter becomes greater than the preset value.

14. An apparatus as defined in claim 13 wherein said means for generating the over-ride command signal generates the over-ride command signal when the level of said output signal from the first stage filter is less-than the preset value and a level of said input signal supplied to the first stage filter is greater than a preset value, wherein the over-ride command signal shuts off as soon as the level of said output signal from the first stage filter becomes greater than the preset value.

15. An apparatus for conditioning an alternating electrical signal generated by vortex shedding in a vortex flowmeter, comprising in combination:
   a) a filter receiving an input signal representing the vortex shedding, including a parallel combination of a first plurality of electronic filters respectively having a first plurality of electronic switches and a second plurality of electronic filters respectively having a second plurality of electronic switches, said first plurality of electronic filters covering a low frequency range and said second plurality of electronic filters covering a high frequency range of vortex shedding frequencies, wherein each of said electronic filters included in said a filter has a different band width and selectively transmits an alternating electrical signal having frequencies distributed substantially within the band width of said each electronic filter, and the first and second plurality of electronic switches are respectively controlled by a first and second command signal in a relationship wherein one of said electronic switches included in said a filter closes when one of the first and second command signal controlling said one electronic switch is generated from frequencies of the alternating electrical signal falling substantially within the band width of one of said electronic filters controlled by said one electronic switch, and stays open when said one of the first and second command signal controlling said one electronic switch is generated from frequencies of the alternating electrical signal falling substantially outside of the band width of said one of said electronic filters controlled by said one electronic switch;
   b) means for converting a frequency of an output signal from said a filter to the first command signal;
   c) means for converting a frequency of said input signal supplied to said a filter to the second command signal; and
   d) means for providing said output signal from said a filter as a refined alternating electrical signal representing the vortex shedding in the vortex flowmeter.

16. An apparatus as defined in claim 15 wherein said combination includes means for generating an over-ride command signal backing up the first command signal in controlling the first plurality of electronic switches in a relationship wherein the over-ride command signal takes over when a level of said output signal from said a filter is less than a preset value and switches on and off the first plurality of electronic switches one at a time in a sweep mode until the level of said output signal from said a filter becomes greater than the preset value, and the over-ride command shuts off as soon as the level of said output signal from said a filter becomes greater than the preset value.

17. An apparatus as defined in claim 16 wherein said means for generating the over-ride command signal generates the over-ride command signal when the level of said output signal from the first stage filter is less than the preset value and a level of said input signal supplied to the first stage filter is greater than a preset value, wherein the over-ride command signal shuts off as soon as the level of said output signal from the first stage filter becomes greater than the preset value.

18. An apparatus as defined in claim 15 wherein said combination includes another filter receiving said output signal from said a filter, comprising in combination:
   a) a parallel combination of a third plurality of electronic filters respectively including a third plurality of electronic switches, wherein each of the third plurality of electronic filters has a different band width and selectively transmits an alternating electrical signal having frequencies distributed substantially within the band width of said one electronic filter, and each of the third plurality of electronic switches closes when a third command signal controlling the third plurality of electronic switches is generated from frequencies of the alternating electrical signal falling substantially within the band width of one of the third plurality of electronic filters controlled by said one electronic switch, and stays open when the third command signal is generated from frequencies of the alternating electrical signal falling substantially outside of the band width of said one of the third plurality of electronic filters controlled by said one electronic switch;
   b) means for converting the frequency of said output signal from said a filter to the third command signal;
   c) means for providing an output signal from said another filter as a further refined alternating electrical signal representing the vortex shedding in the vortex flowmeter 19. An apparatus as defined in claim 18 wherein said combination includes means for generating an over-ride command signal backing up the first command signal in controlling the first plurality of electronic switches in a relationship wherein the over-ride command signal takes over when a level of said output signal from said a filter is less than a preset value and switches on and off the first plurality of electronic switches one at a time in a sweep mode until the level of said output signal from said a filter becomes greater than the preset value, and the over-ride command signal shuts off as soon as the level of said output signal from said a filter becomes greater than the preset value.

20. An apparatus as defined in claim 19 wherein said means for generating the over-ride command signal generates the over-ride command signal when the level of said output signal from said a filter is less than the preset value and a level of said input signal supplied to the first stage filter is greater than a preset value, wherein the over-ride command signal shuts off as soon as the level of said output signal from said a filter becomes greater than the preset value.

* * * * *